US011429895B2

(12) United States Patent
Yakovlev et al.

(10) Patent No.: US 11,429,895 B2
(45) Date of Patent: Aug. 30, 2022

(54) PREDICTING MACHINE LEARNING OR DEEP LEARNING MODEL TRAINING TIME

(71) Applicant: Oracle International Corporation, Redwood Shores, CA (US)

(72) Inventors: Anatoly Yakovlev, Hayward, CA (US); Venkatanathan Varadarajan, Austin, TX (US); Sandeep Agrawal, San Jose, CA (US); Hesam Fathi Moghadam, Sunnyvale, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

(21) Appl. No.: 16/384,588

(22) Filed: Apr. 15, 2019

(65) Prior Publication Data

US 2020/0327448 A1    Oct. 15, 2020

(51) Int. Cl.
*G06N 20/00*    (2019.01)

(52) U.S. Cl.
CPC .................................. *G06N 20/00* (2019.01)

(58) Field of Classification Search
CPC ......... G06N 20/00; G06N 20/10; G06N 20/20
See application file for complete search history.

(56) References Cited

U.S. PATENT DOCUMENTS

| 10,832,087 | B1 | 11/2020 | Wang et al. |
| 2002/0169735 | A1 | 11/2002 | Kil et al. |

(Continued)

FOREIGN PATENT DOCUMENTS

| EP | 2 128 798 A1 | 12/2009 |
| EP | 3 101 599 A2 | 12/2016 |
| WO | WO 2008/133509 A1 | 11/2008 |

OTHER PUBLICATIONS

Reif et al., Prediction of Classifier Training Time Including Parameter Optimization, In Bach et al., KI 2011: Advances in Artificial Intelligence, LNAI 7006, Springer-Verlag Berlin Heidelberg 2011, pp. 260-271 (Year: 2011).*

(Continued)

*Primary Examiner* — Li B. Zhen
*Assistant Examiner* — William Wai Yin Kwan
(74) *Attorney, Agent, or Firm* — Hickman Becker Bingham Ledesma LLP; Brian N. Miller

(57) ABSTRACT

Herein are techniques for exploring hyperparameters of a machine learning model (MLM) and to train a regressor to predict a time needed to train the MLM based on a hyperparameter configuration and a dataset. In an embodiment that is deployed in production inferencing mode, for each landmark configuration, each containing values for hyperparameters of a MLM, a computer configures the MLM based on the landmark configuration and measures time spent training the MLM on a dataset. An already trained regressor predicts time needed to train the MLM based on a proposed configuration of the MLM, dataset meta-feature values, and training durations and hyperparameter values of landmark configurations of the MLM. When instead in training mode, a regressor in training ingests a training corpus of MLM performance history to learn, by reinforcement, to predict a training time for the MLM for new datasets and/or new hyperparameter configurations.

20 Claims, 9 Drawing Sheets

(56) References Cited

U.S. PATENT DOCUMENTS

| | | | |
|---|---|---|---|
| 2014/0344193 | A1 | 11/2014 | Bilenko et al. |
| 2016/0358099 | A1* | 12/2016 | Sturlaugson ............ G06N 5/043 |
| 2017/0061329 | A1* | 3/2017 | Kobayashi ............. G06N 20/00 |
| 2018/0022539 | A1 | 1/2018 | Vedani |
| 2018/0225391 | A1 | 8/2018 | Sali et al. |
| 2018/0357541 | A1 | 12/2018 | Chen et al. |
| 2018/0365065 | A1 | 12/2018 | Guttmann |
| 2019/0087529 | A1 | 3/2019 | Steingrimsson |
| 2019/0095756 | A1 | 3/2019 | Agrawal |
| 2019/0095785 | A1 | 3/2019 | Sarkar |
| 2019/0095818 | A1 | 3/2019 | Varadarajan |
| 2019/0095819 | A1 | 3/2019 | Varadarajan |
| 2019/0197357 | A1 | 6/2019 | Anderson |
| 2019/0244139 | A1 | 8/2019 | Varadarajan |
| 2019/0392255 | A1 | 12/2019 | Franklin |
| 2020/0034197 | A1 | 1/2020 | Nagpal et al. |
| 2020/0082013 | A1 | 3/2020 | Triplet et al. |
| 2020/0118036 | A1 | 4/2020 | Karnagel |
| 2020/0327357 | A1 | 10/2020 | Karnagel |
| 2020/0364599 | A1 | 11/2020 | Ma |
| 2020/0380378 | A1 | 12/2020 | Moharrer |
| 2021/0390466 | A1 | 12/2021 | Varadarajan et al. |

OTHER PUBLICATIONS

Hutter et al., Algorithm runtime prediction: Methods & evaluation, Artificial Intelligence 206 (2014), Elsevier B.V. 2013, pp. 79-111 (Year: 2013).*

Feurer et al., Initializing Bayesian Hyperparameter Optimization via Meta-Learning, Proceedings of the Twenty-Ninth AAAI Conference on Artificial Intelligence, 2015, pp. 1128-1135 (Year: 2015).*

Raschka, Sebastian, Machine Learning FAQ: What is the difference between Pearson R and Simple Linear Regression?, retrieved from web.archive.org (https://web.archive.org/web/20160402054319/http://sebastianraschka.com:80/faq/docs/pearson-r-vs-linear-regr.html), dated Apr. 2, 2016 (Year: 2016).*

USPTO, "Public Views on Artificial Intelligence and Intellectual Property Policy", dated Oct. 2020, 50 pages.

Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.

Olson et al., "Evaluation of a Tree-based Pipeline Optimization Tool for Automating Data Science", dated Mar. 20, 2016, 8 pages.

Kraska, Tim, "Northstar: An Interactive Data Science System", Proceedings of the VLDB Endowment, vol. 11, No. 12 Copyright 2018 VLDB Endowment, 15 pages.

Hutter et al., "Sequential Model-Based Optimization for General Algorithm Configuration", dated 2011, 15 pages.

Andrychowicz et al., "Learning to learn by gradient descent by gradient descent", 30th Conference on Neural Information Processing Systems dated (NIPS 2016), Barcelona, Spain, 9 pages.

Bergstra et al., "Hyperopt: A Python Library for Optimizing the Hyperparameters of Machine Learning Algorithms", Proc. of the 12th Python in Science Conf. (Scipy 2013), dated 2013, 8 pages.

Bergstra et al., "Hyperparameter Optimization and Boosting for Classifying Facial Expressions: How good can a "Null" Model be?", ICML Workshop on Representation and Learning, dated 2013, 7 pages.

Bergstra et al., "Making a Science of Model Search: Hyperparameter Optimization in Hundreds of Dimensions for Vision Architectures", JMLR: W & CP, vol. 28, dated 2013, 9 pages.

Bergstra et al., "Random Search for Hyper-Parameter Optimization", Journal of Machine Learning Research 13 (2012) 281-305, dated Feb. 2012, 25 pages.

Caruana et al., "Ensemble Selection From Libraries of Models", Proceedings, Twenty-First International Conference on Machine Learning: dated Jul. 2004, 8 pages.

Chen Chi-Ou et al., "Machine Learning-Based Configuration Parameter Tuning on Hadoop System", dated Jun. 27, 2015, IEEE, pp. 386-392.

Doan et al., "Algorithm Selection Using Performance and Run Time Behavior", Chapter, Artificial Intelligence: Methodology, Systems and Applicationsm AIMSA dated Sep. 2016, pp. 3-13.

Doan et al., "Selecting Machine Learning Algorithms using Regression Models", https://www.researchgate.net/publication/304298580, dated Nov. 2015, 8 pages.

Feurer et al., "Efficient and Robust Automated Machine Learning", dated 2015, 9 pages.

Feurer et al., "Initializing Bayesian Hyperparameter Optimization via Meta-Learning", Proceedings of the Twenty-Ninth AAAI Conference on Artificial Intelligence, dated Jan. 2015, 8 pages.

Aldave et al., "Systematic Ensemble Learning for Regression" dated Mar. 28, 2014, pp. 1-38.

Gonzalez et al., "Batch Bayesian Optimization via Local Penalization", Proceedings of the 19th International Conference on Artificial Intelligence and Statistics, dated 2016, 10 pages.

Weinberger et al., "Unsupervised learning of image manifolds by semidefinite programming", IEEE, dated Jun. 27, 2004, 10 pages.

J.D Wichard, "Model Selection in an Ensemble Framework", The 2013 International Joint Conference on Neural Networks, dated Jan. 1, 2006, pp. 2187-2192.

Kuck et al, "Meta-learning with neural networks and landmarking for forecasting model selection an empirical evaluation of different feature sets applied to industry data", dated Jul. 24-29, 2016, 8pgs.

Maclaurin et al., "Gradient-based Hyperparameter Optimization through Reversible Learning", Proceedings of the 32nd International Conference on Machine Learning, Lille, France, dated 2015, 10 pages.

Mendes-Moreira et al., "Ensemble Approaches for Regression", ACM Computing Surveys, ACM, New York, NY vol. 45, No. 1, dated Dec. 7, 2012, pp. 1-40.

Nelder et al., "A Simplex Method for Function Minimization", The Computer Journal, vol. 7, dated Apr. 1, 1964, pp. 308-313.

Pedregosa, Fabian, "Hyperparameter Optimization with Approximate Gradient", Proceedings of the 33rd International Conference on Machinelearning, New York, vol. 48, dated Jun. 26, 2016, pp. 1-15.

Pinter, Janos, "Calibrating Artificial Neural Networks by Global Optimization", Technical Report, Özyeğin University, Istanbul Submitted for publication: Jul. 2010, 17 pages.

Scikit Learn, "3.2. Tuning the hyper-parameters of an estimator", http://scikitlearn.org/stable/modules/grid_search.html, dated 2017, 6 pages.

Simpson et al, "Automatic Algorithm Selection in Computational Software Using Machine Learning", dated 2016, 10 pages.

Snoek et al, "Input Warping for Bayesian Optimization of Non-Stationary Functions", Proceedings of the 31 st International Conference on Machine Learning, Beijing, China, 2014, 9 pages.

Snoek et al., "Scalable Bayesian Optimization Using Deep Neural Networks", dated 2014, 10 pages.

Snoek, "Practical Bayesian Optimization of Machine Learning Algorithms", dated 2012, 9 pages.

Gonnet et al., Automatic Problem-Specific Hyperparameter Optimization and Model Selection for Supervised Machine Learning, Technical Report, dated Jan. 1, 2015, 54 pages.

Varadarajan, U.S. Appl. No. 15/914,883, filed Mar. 7, 2018, Office Action, dated Dec. 1, 2020.

Singh et al., "Literature Review on Feature Selection Methods for High-Dimensional Data", International Journal of Computer Applications, vol. 136, No. 1, dated Feb. 2016, 9 pages.

Parmezan et al., "Metalearning for Choosing Feature Selection Algorithms in Data Mining: Proposal of a New Framework", Preprint submitted to Expert Systems with Applications, Nov. 4, 2016, 66 pgs.

Microsodt Docs, "Feature Selection in the Team Data Science Process", dated Nov. 20, 2017, 5 pages.

Li et al., "Feature Selection: A Data Perspective", AMC, Computer Suru 9, Article 39, dated Mar. 2010, 45 pages.

Krupka et al., "Learning to Select Features using their Properties", Journal of Machine Learning Research 9, dated 2008, 28 pages.

Zhu et al., "To prune, or not to prune: exploring the efficacy of pruning for model compression", dated 2017, 11 pages.

(56) References Cited

OTHER PUBLICATIONS

Stamoulis et al., "HyperPower: Power- and Memory-Constrained Hyper-Parameter Optimization for Neural Networks", dated 2018, 7 pages.
Sprechmann et al., "Memory-Based Parameter Adaptation", Published as a conference paper at ICLR dated 2018, 16 pages.
Sohoni et al., "Low-Memory Neural Network Training: A Technical Report", Stanford University, dated Apr. 25, 2019, 38 pages.
Prasad et al., "Distributed Feature Selection Using Vertical Partitioning for High Dimensional Data", ICACCI, dated Sep. 12, 2016, 8 pages.
Moran-Fernandez et al., "Centralized vs. Distributed Feature Selection Methods Based on Data Complexity Measures", Knowledge-based Systems, dated Sep. 28, 2016, 20 pages.
Li et al., "Hyperband: A Novel Bandit-Based Approach to Hyperparameter Optimization", Journal of Machine Learning Research 18 (dated 2018) pp. 1-52.
Han et al., "Deep Compression: Compressing Deep Neural Networks With Pruning, Trained Quantization and Huffman Coding", Conference Paper at ICLR dated 2016, 14 pages.
Gelbart et al., "Bayesian Optimization with Unknown Constraints", dated 2014, 10 pages.
Bolon-Canedo et al., "Distributed Feature Selection: An Application to Microarray Data Classification", Applied Soft Computing, dated Feb. 7, 2015, 16 pages.
Zhen Hua Liu et al. "JSON Data Management in RDBMS", Emerging Technologies and Applications in Data Processing and Management, dated May 13, 2019, pages 20-45.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902. txt", Javascript Object Notation (JSON) Patch, Internet Engineering Task Force, Standard, Internet Society, Apr. 3, 2013, 18 pages.
Jomaa et al., "Dataset2Vec: Learning Dataset Meta-Features", pages, dated Aug 30, 2020, 23 pages.
Abe et al., "Developing an Integrated Time-Series Data Mining Environment for Medical Data Mining", Seventh IEEE International Conference on Data Mining—Workshops, dated 2007, 6 pages.
Ahmed et al., "An Empirical Comparison of Machine Learning Models for Time Series Forecasting", dated Sep. 15, 2010, 31 pages.
Amazon Sage Maker, "DeepAR Forecasting Algorithm", https://docs.aws.amazon.com/sagemaker/latest/dg/deepar.html,last viewed on Jun. 29, 2020, 5 pages.
Artificial Intelligence Blog, "Announcing automated ML capability in Azure Machine Learning", dated Sep. 24, 2018, 8 pages.
Brownlee, Jason, "Time Series Forecasting as Supervised Learning", dated Aug. 21, 2019, 2 pages.
Camerra et al., "Beyond one billion time series: indexing and mining very large time series collections with iSAX2+", dated Feb. 16, 2013, 29 pages.
Hutter et al., "Sequential Model-Based Optimization for General Algorithm Configuration", Conference on the Theory and Applications of Cryptographic Techniques, dated Jan. 17, 2011, 15 pages.
Wang et al., "Experimental comparison of representation methods and distance measures for time series data", dated Feb. 12, 2010, 35 pages.
Lin et al., "Experiencing SAX: a novel symbolic representation of time series", dated Apr. 3, 2007, 38 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r -th Root of Rank Supervised Joint Binary Embedding for Multivariate Time Series Retrieval", KDD 2018, dated Aug. 19-23, 2018, London, United Kingdom, 10 pages.

Thornton et al., "Auto-WEKA: Combined Selection and Hyperparameter Optimization of Classification Algorithms", New York, New York, dated Mar. 6, 2013, 9 pages.
Faloutsos et al., "Fast Subsequence Matching in Time Series Databases", dated 1998, 11 pages.
Varadarajan, U.S. Appl. No. 15/914,883, filed Mar. 7, 2018, Final Office Action, dated Mar. 2, 2021.
Varadarajan, U.S. Appl. No. 15/885,515, filed Jan. 31, 2018, Office Action, dated Jun. 17, 2021.
Kim et al., "Learning to Transfer Initializations for Bayesian Hyperparameter Optimization", 31st Conference on Neural Information Processing Systems dated 2017, Long Beach, CA, USA, 5 pages.
Bardenet et al., "Collaborative hyperparameter tuning", Proceedings of the 30 th International Conference on Machine Learning, Atlanta, Georgia, USA, 2013, 9 pages.
Brown et al., "Conditional Likelihood Maximisation: A Unifying Framework for Information Theoretic Feature Selection", Journal of Machine Learning Research 13 (2012), 40 pages.
Chandrashekar et al., "A survey on feature selection methods", Computers and Electrical Engineering 40 dated 2014, 13 pages.
Feurer et al., "Initializing Bayesian Hyperparameter Optimization via Meta-Learning", dated 2015, 8 pages.
Feurer et al., "Using Meta-Learning to Initialize Bayesian Optimization of Hyperparameters", dated 2014, 8 pages.
Albon, Chris, "ANOVA F-Value for Feature Selection", dated Dec. 20, 2017, 2 pages.
Hutter et al., "Automatic Machine Learning: Methods, Systems, Challenges", dated Oct. 16, 2018, 250 pages.
Yogatama et al., "Efficient Transfer Learning Method for Automatic Hyperparameter Tuning", Proceedings of the 17th International Conference on Artifical Intelligence and Statistics dated 2014, 9 pages.
Kohavi, Ron, "Wrappers for Performance Enhancement and Oblivious Decision Graphs", dated Sep. 1995, 304 pages.
Microsoft Docs, "Feature Selection Modules", dated May 5, 2019, 7 pages.
Molina et al., "Feature Selection Algorithms: A Survey and Experimental Evaluation", dated 2002, 19 pages.
Narendra et al., "A Branch and Bound Algotithm for Feature Subset Selection", IEEE Transactions on Computers, vol. C-26, No. 9, dated Dec. 1977, 6 pages.
Pudil et al., "Floating Search Methods in Feature Selection", dated Jun. 19, 1993, 9 pages.
Swersky et al., "Multi-Task Bayesian Optimization", dated 2013, 9 pages.
Guyon et al., "An Introduction to Variable and Feature Selection", Journal of Machine Learning Research 3 dated 2003, 26 pages.
Reif et al., "Prediction of Classifier Training Time including Parameter Optimization", dated Oct. 2011, 13 pages.
Peskov'a et al., "Hybrid Multi-Agent System for Metalearning in Data Mining", dated Sep. 19, 2014, 2 pages.
Lindner et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Furnkranz et al., "An Evaluation of Landmarking Variants", dated 2001, 12 pages.
Filchenkjov et al., "Datasets Meta-Feature Description for Recommending Feature Selection Algorithm", dated Nov. 2015, 9 pages.
Feurer et al., "Initializing Bayesian Hyperparameter Optimization via Meta-Learning", Proceedings of the Twenty-Ninth AAAI Conference on Artificial Intelligence dated 2015, 8 pages.
Castiello et al., "Meta-data: Characterization of Input Features for Meta-learning", Springer-Verlag Berlin Heidelberg dated 2005, 13 pages.
Brazdil, Pavel, "Metalearning and Algorithm Selection: Progress, State of the Art and Introduction of the 2018 Special Issue", dated Dec. 2017, 23 pages.

(56) References Cited

OTHER PUBLICATIONS

Brazdil et al., "Ranking Learning Algorithms: Using IBL and Meta-Learning on Accuracy and Time Results", dated 2003 Kluwer Academic Publishers. Manufactured in The Netherlands, 27 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Hsu et. al., "A Practical Guide to Support Vector Classification", May 19, 2016, National Taiwan University, 2016, pp. 1-16.
Hadi S. Jomaa et al., "Dataset2Vec: Learning Dataset Meta-Features," May 27, 2019, 13 pages.
Brochu et. al., "A Tutorial on Bayesian Optimization of Expensive Cost Functions, with Application to Active User Modeling and Hierarchical Reinforcement Learning", pp. 1-49.
Varadarajan, U.S. Appl. No. 16/137,719, filed Sep. 21, 2018, Notice of Allowance, dated Aug. 4, 2021.
Varadarajan, U.S. Appl. No. 16/137,719, filed Sep. 21, 2018, Notice of Allowance, dated Jul. 9, 2021.
Varadarajan, U.S. Appl. No. 16/137,719, filed Sep. 21, 2018, Interview Summary, dated Jul. 9, 2021.
Varadarajan, U.S. Appl. No. 15/914,883, filed Mar. 7, 2018, Advisory Action, dated Dec. 13, 2021.
Varadarajan, U.S. Appl. No. 15/914,883, filed Mar. 7, 2018, Non-Final Rejection, dated Aug. 17, 2021.
Varadarajan, U.S. Appl. No. 15/914,883, filed Mar. 7, 2018, Final Rejection, dated Oct. 22, 2021.
Varadarajan, U.S. Appl. No. 15/914,883, filed Mar. 7, 2018, Advisory Action, dated Jun. 28, 2021.
Varadarajan, U.S. Appl. No. 15/885,515, filed Jan. 31, 2018, Notice of Allowance, dated Aug. 4, 2021.
Varadarajan, U.S. Appl. No. 15/885,515, filed Jan. 31, 2018, Notice of Allowance, dated Jul. 26, 2021.
Matthias Reif, et al., "Dataset Generation for Meta-Learning," 2012, pp. 69-73.
Christophe Giraud-Carrier, et al., "New Insights into Learning Algorithms and Datasets," Jan. 2008, 7 pages.
Amasyali et al., "A Study of Meta Learning for Regression", http://docs.lib.purdue.edu/ecetr, dated Jul. 1, 2009, 26 pages.
Varadarajan, U.S. Appl. No. 15/914,883, filed Mar. 7, 2018, Non-Final Rejection, dated Jan. 20, 2022.
Karnagel, U.S. Appl. No. 16/417,145, filed May 20, 2019, Non-Final Rejection, dated Dec. 24, 2021.
The International Searching Authority, "Search Report" in Application No. PCT/US2021/044093, dated Dec. 23, 2021, 13 pages.
Li et al., "Practical Resource Usage Prediction Method for Large Memory Jobs in HPC Clusters", Asian Conference on Supercomputing Frontiers, https://link.springer.com/chapter/10.1007%2F978-3-030-18645-6_1, dated Apr. 2019, 18 pages.
Current Claims in Application No. PCT/US2021/044093, dated Dec. 2021, 4 pages.

* cited by examiner

FIG. 7

COMPUTER 700

| HYPERPARAMETERS ||
|---|---|
| NUMERIC 711 | CATEGORICAL 712 |

| LANDMARKS |||
|---|---|---|
| CONFIGURATION | NEURAL LAYERS | ACTIVATION FUNCTION |
| 1 | 1 | RELU |
| 2 | 1 | SIGMOID |
| 3 | 1 | TANH |
| 4 | 5 | RELU |
| 5 | 5 | SIGMOID |
| 6 | 5 | TANH |
| 7 | 10 | RELU |
| 8 | 10 | SIGMOID |
| 9 | 10 | TANH |

PREDICTING MACHINE LEARNING OR DEEP LEARNING MODEL TRAINING TIME

FIELD OF THE INVENTION

The present invention relates to training time prediction for machine learning (ML) models (algorithms). Herein are meta-learning techniques for exploring a multidimensional hyperparameter space of a ML model and to train a regressor to predict how much time would be needed to train the ML model based on a hyperparameter configuration and a dataset.

BACKGROUND

Use of machine learning (ML), such as deep learning (DL), is rapidly spreading through industries and business units and is becoming a ubiquitous tool within some corporations. A way to optimize an ML model entails tuning its hyperparameters, which are configuration settings. During hyperparameter tuning, an ML model is repeatedly trained with different (e.g. improving) hyperparameter values to explore a multidimensional configuration hyperparameter space. That exploration may be resource intensive of time and/or compute resources. Hyperparameter settings, often, have strong impact on model performance (e.g., accuracy, f1 score, etc.). Tuning a model's hyperparameters can be extremely time consuming especially for larger datasets.

There are several challenges in accurately predicting training times for models, including predicting absolute training time. Absolute training time has large variation within a dataset when changing hyperparameter settings. In other words, training time is unstable. The difference in time it takes to train a model to convergence can span several orders of magnitude across different hyperparameter settings. For example, training time for three common types of ML models can vary with hyperparameter adjustments by respective factors of 90, 14,000, and 70,000. Additionally, the trend in which this change in training time occurs is not necessarily consistent for different datasets. That is, training time can increase with increasing values of hyperparameter settings for one dataset, but decrease for another dataset, which provides more instability.

BRIEF DESCRIPTION OF THE DRAWINGS

In the drawings:

FIG. 7 is a block diagram that depicts an example computer that has heuristics for generating a more or less optimal set of landmark configurations;

DETAILED DESCRIPTION

Figure 1:
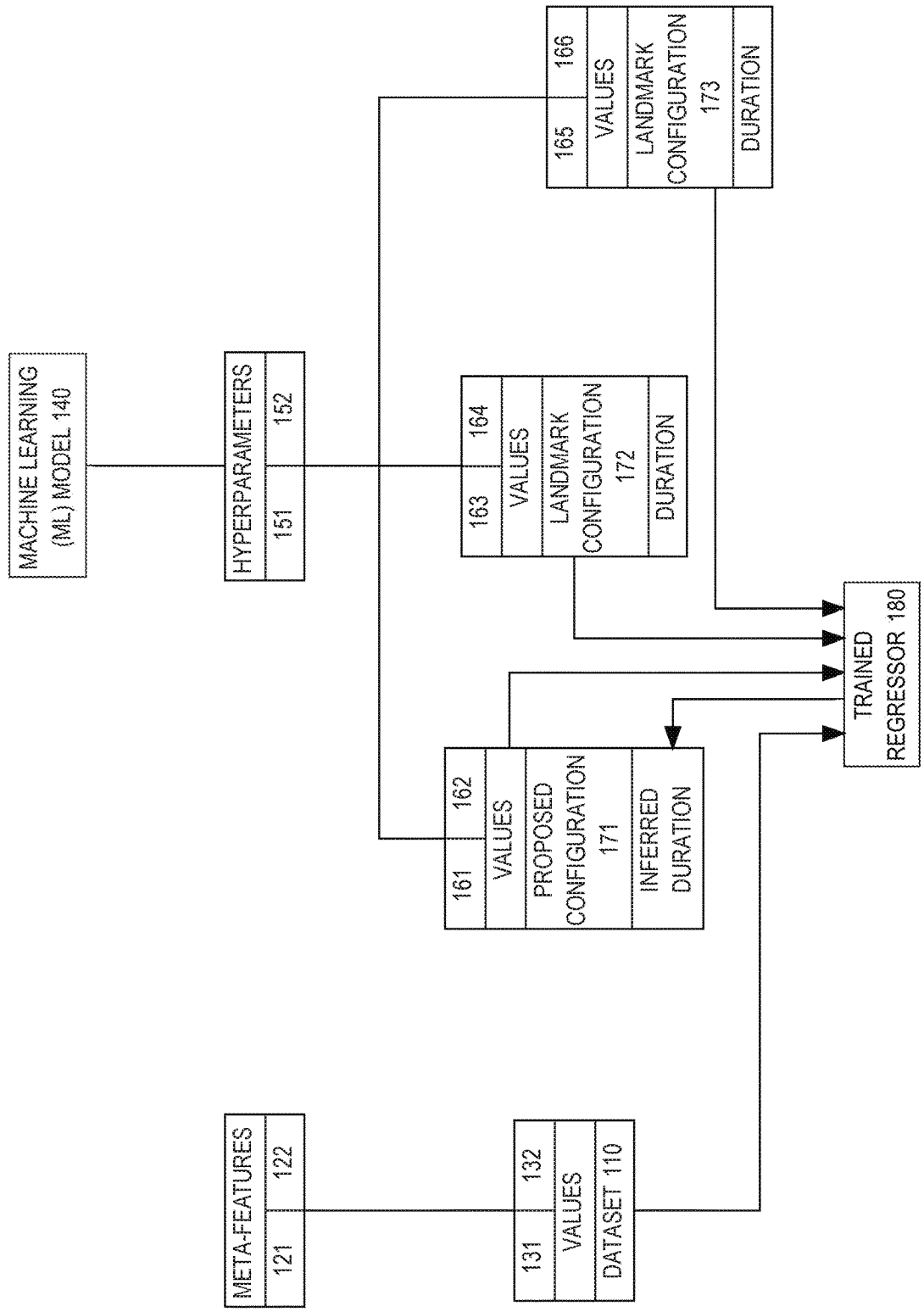
FIG. 1 is a block diagram that depicts an example computer that uses an already trained regressor to predict how much time would be needed to train a machine learning (ML) model based on a hyperparameter configuration and a dataset.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are meta-learning techniques for exploring a multidimensional hyperparameter space of a machine learning (ML) model and to train a regressor to predict how much time would be needed to train the ML model based on a hyperparameter configuration and a dataset. Accurate prediction of model training time for a given dataset and hyperparameters setting requires collecting much data in order to train a regressor without overfitting. Too little data may cause a model to overfit to the provided data and would result in inaccurate generalization to new examples. Because the task of regressors herein is to predict model training time for a new dataset and/or new hyperparameter settings, some embodiments may need a feature vector to capture a meta-description (e.g. digest) of the training dataset and the ML model's hyperparameter performance landscape. To describe a training dataset, meta-features such as dataset shape (e.g. number of rows and columns) may be insufficient. Derived (e.g. more complex) descriptors may be necessary, such as statistical, and information-theoretic features of a dataset. Some examples of meta-features are: dataset shape, number of numerical features, dimensionality, majority and minority class size, and class ratio. A dataset meta-feature may be statistical such as: mean, min, max, quantile values of features, skew, and kurtosis. There may be information-theoretic meta-features such as: mean, min, max, and quantile values of feature mutual information. Meta-features such as those can be put together into an encoded feature vector.

Hyperparameter features that affect model training time for multiple datasets may be collected. These features are a collection of hyperparameter settings for an ML model of interest. Each unique hyperparameter configuration vector, together with dataset meta-features, makes up a unique training example for a regressor that can be trained to predict training times for the ML model. For example, in the case of a support vector machines classifier (SVC) ML model, important hyperparameters to tune are gamma and C. In many practical cases, tuning ranges for gamma and C are [0.1, 10.0] and [1.0, 1000.0], respectively. Those are continuous ranges of real numbers, meaning that both ranges, although bounded, still contain an infinite amount of values to explore, which may be computationally intractable without intelligent heuristics such as herein.

While a snapshot of dataset meta-features and a hyperparameter configuration provide good information, they insufficiently describe a natural spectrum of possible operational performance, such as training time behavior of other hyperparameter configurations and/or other datasets for a same ML model. Herein, configuration landmarks are introduced to make training time prediction flexible and more accurate for a regressor. In an embodiment, these configuration landmarks and their benchmark training times are encoded as features into a feature vector with which a prediction regressor may be trained or otherwise applied. Thus, a (e.g. very) low resolution sketch of a configuration hyperspace's performance landscape for a new dataset may be provided to a (e.g. already trained) regressor to increase accuracy of the regressor's prediction.

In an embodiment that is deployed in production inferencing mode, for each landmark configuration, each containing values for hyperparameters of a ML model, a computer configures the ML model based on the landmark configuration and measures a duration spent training the ML model on a dataset. An already trained regressor predicts an inferred duration needed to train the ML model based on: a) a proposed configuration of the ML model, b) dataset meta-feature values, and c) training durations and hyperparameter values of landmark configurations of the ML model. In an embodiment that is instead deployed in training mode, a regressor in training ingests a training corpus of ML model performance history to learn, by reinforcement, to predict a training time for the ML model for a new dataset and/or a new hyperparameter configuration of the ML model.

Predicting training time may facilitate cost-aware hyperparameter tuning, which may achieve cost-based task scheduling and task management, cost-based scaling and resource allocation, as well as cost-aware multi-tenant scheduling. Those activities require accurate prediction of ML model training time for a given dataset when the model is configured with given hyperparameter settings. Given that one or more trained regressors for different ML models exist, predicting training time may also facilitate cost-aware model selection.

1.0 Example Computer

FIG. 1 is a block diagram that depicts an example computer 100, in an embodiment. Computer 100 uses an already trained regressor to predict how much time would be needed to train a machine learning (ML) model based on a hyperparameter configuration and a dataset. Computer 100 may be one or more of a rack server such as a blade, a personal computer, a mainframe, a virtual computer, or other computing device.

Computer 100 may store within its memory two ML models 140 and 180. Depending on the embodiment, ML model 140 is designed for clustering, classification, regression, anomaly detection, prediction, or dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as scikit-learn (sklearn), Google's TensorFlow for Python and C++ or Georgia Institute of Technology's MLPack for C++. Shogun is an open source C++ ML library with adapters for several programing languages including C#, Ruby, Lua, Java, MatLab, R, and Python.

ML model 140 may have one of many model types. Each model type may have adjustable attributes (i.e. hyperparameters such as 151-152) that can be optimized to improve performance in various ways such as increased inference accuracy and/or reduced consumption of resource(s), such as time and/or space, during training and/or inferencing. Different model types have different amounts and different kinds of hyperparameters.

Each of hyperparameters 151-152 has a range of multiple (e.g. infinitely many) values. Combinatorics of hyperparameters 151-152 presents a hyperdimensional configuration space, with each of hyperparameters 151-152 being one dimension of the configuration space.

Exploration of the configuration space may alter performance of ML model 140, which may simultaneously achieve improvement(s) and/or degradation(s). For example, changing value(s) of hyperparameter(s) may cause both training acceleration and decreased accuracy.

One way to detect the potential acceleration from hyperparameter values is to actually configure ML model 140 with those values and actually measure time spent training ML model 140. However, training time for ML model 140 may be substantial and accompanied by central processing unit (CPU) consumption of electricity. As follows herein, that time and energy may be saved by instead having trained regressor 180 predict a training time for ML model 140, without actually configuring and training ML model 140 based on those hyperparameter values.

In this example, trained regressor 180 is already trained, according to techniques described later herein, to predict how much time would ML model 140 spend training when configured with hyperparameter values and applied to a training dataset. Trained regressor 180 may be a random forest, an artificial neural networks (ANN), or other regressor that is capable of reinforcement learning. Operation of trained regressor 180 is as follows.

Trained regressor 180 is sensitive to both of machine learning model 140 and training dataset 110. Dataset 110 is a collection (i.e. corpus) of training examples that ML model 140 may train with. For example, dataset 110 may be a set of example pictures. Dataset 110 has meta-features 121-122 that are statistics and other attributes. For example, meta-feature 121 may indicate what percentage of pictures in dataset 110 are monochromatic. For example, meta-feature 122 may indicate how many pictures does dataset 110 have or what is a minimum, maximum, or mean diagonal length of the pictures. Freely available benchmark datasets for proofs of concept include OpenML's binary classification datasets.

Meta-features 121-122 are abstractions; they are generalized attributes that may occur with any dataset of pictures. Other types of datasets have different amounts and different kinds of meta-features. Likewise, different datasets of pictures have different values for meta-features 121-122. For example, dataset 110 has values 131-132 for respective meta-features 121-122.

More general meta-features include: a count of features of dataset 110, a count of numeric features of dataset 110, a total count of examples (e.g. pictures) within dataset 110, a majority count of examples within dataset 110 having a majority label of many classification labels of dataset 110, and/or a minority count of examples within dataset 110 having a minority label of the many labels of dataset 110. General meta-features may include a ratio of two of: said total count, said majority count, and said minority count. General meta-features may include a value, of a feature of dataset 110, that is: a minimum, a maximum, a mean, and/or a quantile. For example, meta-feature value 131 may be an average pixel luminosity of dataset 110.

Likewise, different configurations 171-173 of ML model 140 have different values of hyperparameters 151-152. For example, configuration 173 has values 165-166 for respective hyperparameters 151-152.

A use case for trained regressor 180 is as follows. Proposed configuration 171 has a (e.g. arbitrary) distinct set of values 161-162 for hyperparameters 151-152. Trained regressor should predict how long would ML model 140 need to train with dataset 110 when configured with proposed configuration 171.

A random forest may be especially useful as an implementation of regressor 180 because it has explanatory and diagnostic capability in addition to the predictive capability of other regressor types. While other regressor types may be opaque (i.e. hidden or unintelligible internals), the architecture of a trained random forest may indicate a ranking of features (e.g. dataset meta-features or ML model hyperparameters) by importance (i.e. impact on training time). For example if ML model 140 is an ANN, then random forest regressor 180 may indicate that total neuron count of the ANN model 140 is more significant to training time than how many layers are those neurons arranged into. Likewise if dataset 110 is a collection of pictures, then random forest regressor 180 may indicate that total pixel count of all pictures in dataset 110 is more important than whether the pictures are color or monochrome. A random forest may also facilitate ML explainability (MLX), including complicated explanations such as diminishing returns when total pixel count exceeds a billion, or total pixel count being much more important when pictures are monochrome instead of color.

Trained regressor 180 may be comprised of logic and data structures that reside in random access memory (RAM) of computer 100. Each example (e.g. picture) within dataset 110 may be a separate file on disk or a separate row (e.g. master row with details rows) in a (e.g. relational) database. Computer 100 may receive/store proposed configuration 171 as a data structure in RAM, which may initiate processing as follows.

Computer 100 may generate at least landmark configurations 172-173 that have distinct sets of values and are well (e.g. evenly and widely) spaced within the configuration hyperspace of hyperparameters 151-152. Landmark configurations 172-173 should be representative samples that provide at least a glimpse of the landscape (i.e. gradients) within the configuration hyperspace. For example, some extrapolation and/or interpolation might be possible (i.e. somewhat valid) once the performance metrics of landmark configurations 172-173 are known. In an embodiment, a fixed amount of landmark configurations are generated. In an embodiment, the amount of landmark configurations depends on how many hyperparameters (i.e. dimensions) are involved. Techniques for generating landmark configurations are discussed later herein.

ML model 140 is repeatedly reconfigured and trained with dataset 110, once for each of landmark configurations 172-173. A duration spent training is recorded for each of landmark configurations 172-173. Thus, computer 100 empirically detects how long does training take for all landmarks with dataset 110.

Each of configurations 171-173 may be encoded as a tuple that contains a set of values of hyperparameters and a training duration. For example, configuration 172 may be represented as a triplet that contains values 163-164 and a duration. Those tuples may be concatenated to form a feature vector or as input to trained regressor 180. A feature vector may be a contiguous column of values.

In an embodiment, a feature vector contains only numbers. Depending on the embodiment, categorical values may be mapped to dense ordinal integers or to sparse one-hot bitmap values that may or may not be interpreted as integers. For example, red, yellow, and blue may be respectively feature encoded as 0, 1, and 2. In an embodiment, a feature vector contains only normalized numbers (e.g. 0.0-1.0). For example, based on a minimum and maximum of a value range, an arbitrary integer value may be converted into a percentage. Thus, hyperparameters of different types may be homogenized into specifically typed numbers for uniformity.

The feature vector is expanded by concatenating meta-feature values 131-132 of dataset 110, with numeric conversions as needed. The resulting feature vector may be quite wide and thus feature rich. When applied to the feature vector, trained regressor 180 calculates a duration that predicts how long ML model 140 would spend training with dataset 110 when configured with proposed configuration 171. That prediction is shown as the inferred duration of proposed configuration 171. Trained regressor 180 may be repeatedly invoked with various configurations of ML model 140 to discover configuration(s) that train faster.

Depending on the exploration (i.e. optimization) algorithm used, trained regressor 180 may eventually discover a configuration that more or less has a minimum training time. Termination (i.e. convergence) criteria for the exploration depends on the embodiment. For example, trained regressor 180 may be invoked a few times to quickly find a good configuration, or may be invoked many times to laboriously find a much better configuration.

2.0 Example Prediction Process

Figure 2:
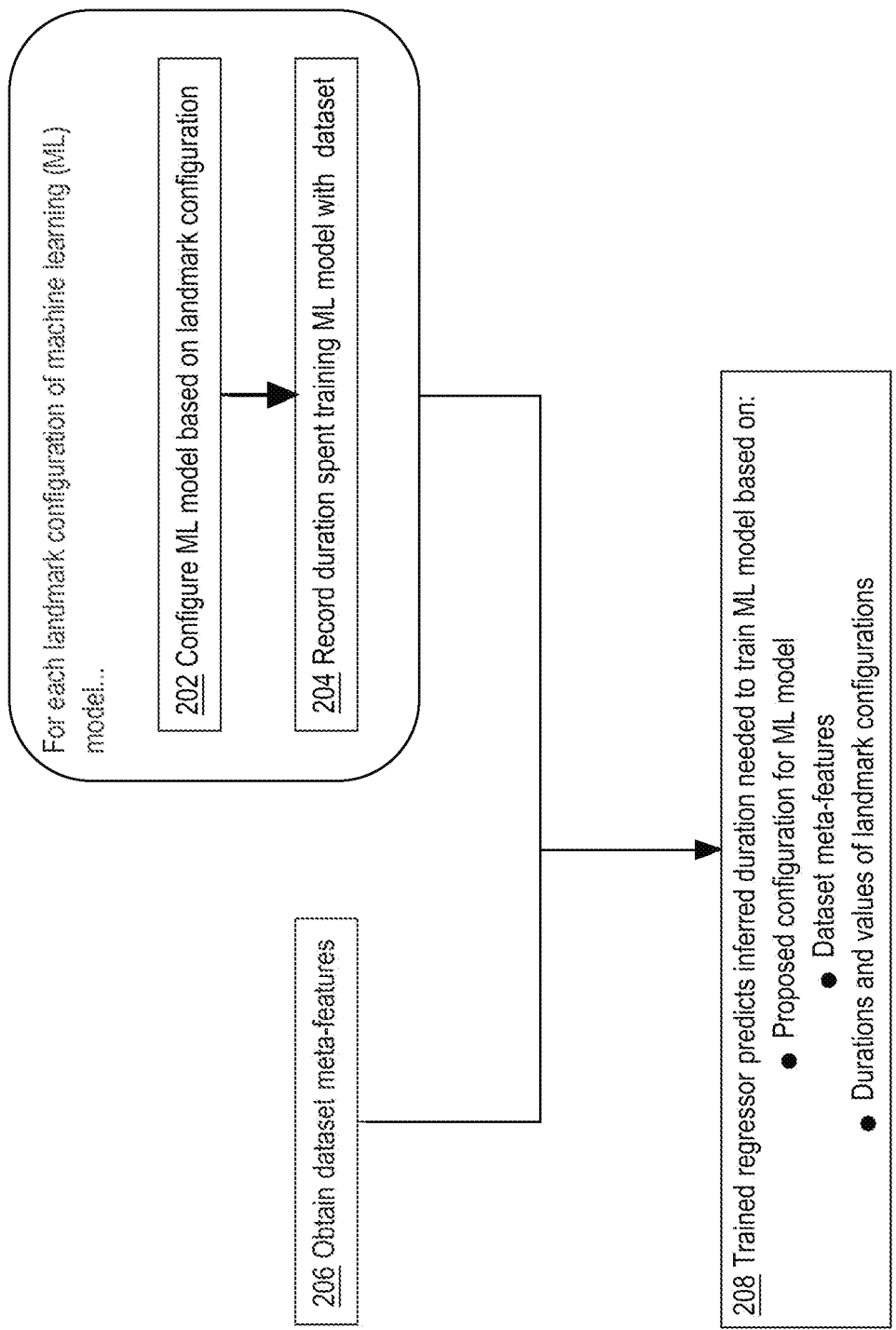
FIG. 2 is a flow diagram that depicts an example computer process for using an already trained regressor to predict how much time would be needed to train a machine learning (ML) model based on a hyperparameter configuration and a dataset.

FIG. 2 is a flow diagram that depicts computer 100 using an already trained regressor to predict how much time would be needed to train a machine learning (ML) model based on a hyperparameter configuration and a dataset, in an embodiment. FIG. 2 is discussed with reference to FIG. 1.

As shown in FIG. 1, trained regressor 180 is already trained and ready to predict training times for experimental configurations and/or novel datasets. Prediction occurs in two phases. First, landmark benchmarking occurs in steps 202 and 204. Then, inferencing occurs in step 208.

Steps 202, 204, and 206 are preparatory and may occur as soon as dataset 110 is available, even if proposed configuration 171 is not yet generated. Steps 202 and 204 are repeated for each landmark configuration, to produce a set of timing benchmarks within a feature landscape. For example, such benchmarking may occur once for dataset 110 and the timing results may be saved for repeated reuse. For example, prediction for a first configuration of ML model 140 for dataset 110 may entail all steps of FIG. 2. Whereas, prediction of a second configuration (not shown) with same dataset 110 need only perform inferencing step 208. That is, steps 202, 204, and 206 may be skipped for subsequent predictions when landmark benchmarking results and meta-features of a same dataset 110 are already available. Thus, a cost of steps 202, 204, and 206 may be amortized more or less away after many predictions. For example, all but a first prediction may be more or less instantaneous, which means that exploration (e.g. optimization) toward fastest trainings is feasible.

Steps 202 and 204 benchmark landmarks. That entails actually configuring (step 202) ML model 140 with hyperparameter values of a landmark configuration such as 172 and then recording (step 204) how long does training of ML model 140 take. After steps 202 and 204 are repeated for each landmark configuration, the landscape of the configuration hyperspace for dataset 110 has become slightly known, including multiple gradients in multiple directions at each landmark. In an embodiment, computer 100 encodes that vague landscape as a segment of a feature vector. That segment of encoded features contains encoded landmark benchmarks that each contain landmark values of hyperparameters and a benchmark duration.

Step 206 may be asynchronous (e.g. concurrent) to steps 202 and 204. In step 206, values 131-132 for meta-features 121-122 are obtained that describe dataset 110. Depending on which meta-feature and which embodiment, determining a meta-feature may require analysis of one or all examples within dataset 110. Results (e.g. values 131-132) of steps 202, 204, and/or 206 may be persisted for later (e.g. repeated) use.

Step 208 is (e.g. again) triggered by the later of either of: completion of step 206, completion of step 204 for all landmarks of dataset 110, or injection of proposed configuration 171 into trained regressor 180. Step 208 applies trained regressor 180 to proposed configuration 171 to predict an inferred duration of how long would training ML model 140 take. During the process of FIG. 2, ML model 140 is not actually configured with proposed configuration 171, and the inferred duration is merely a trained estimate. By inferencing operation of trained regressor 180, the inferred duration is generated. In an embodiment, ML model 140 is applied to a feature vector that is based on the hyperparameter values of proposed configuration 171, the meta-feature values of dataset 110, and the benchmark durations and hyperparameter values of the landmark configurations.

Step 208 may be repeated for other configurations of ML model 140, such as for configuration exploration such as optimization. Depending on the embodiment, when dataset 110 is replaced, steps 202, 204, and 206 may need revisiting to take new values of the dataset meta-features.

3.0 Regressor Training

Figure 3:
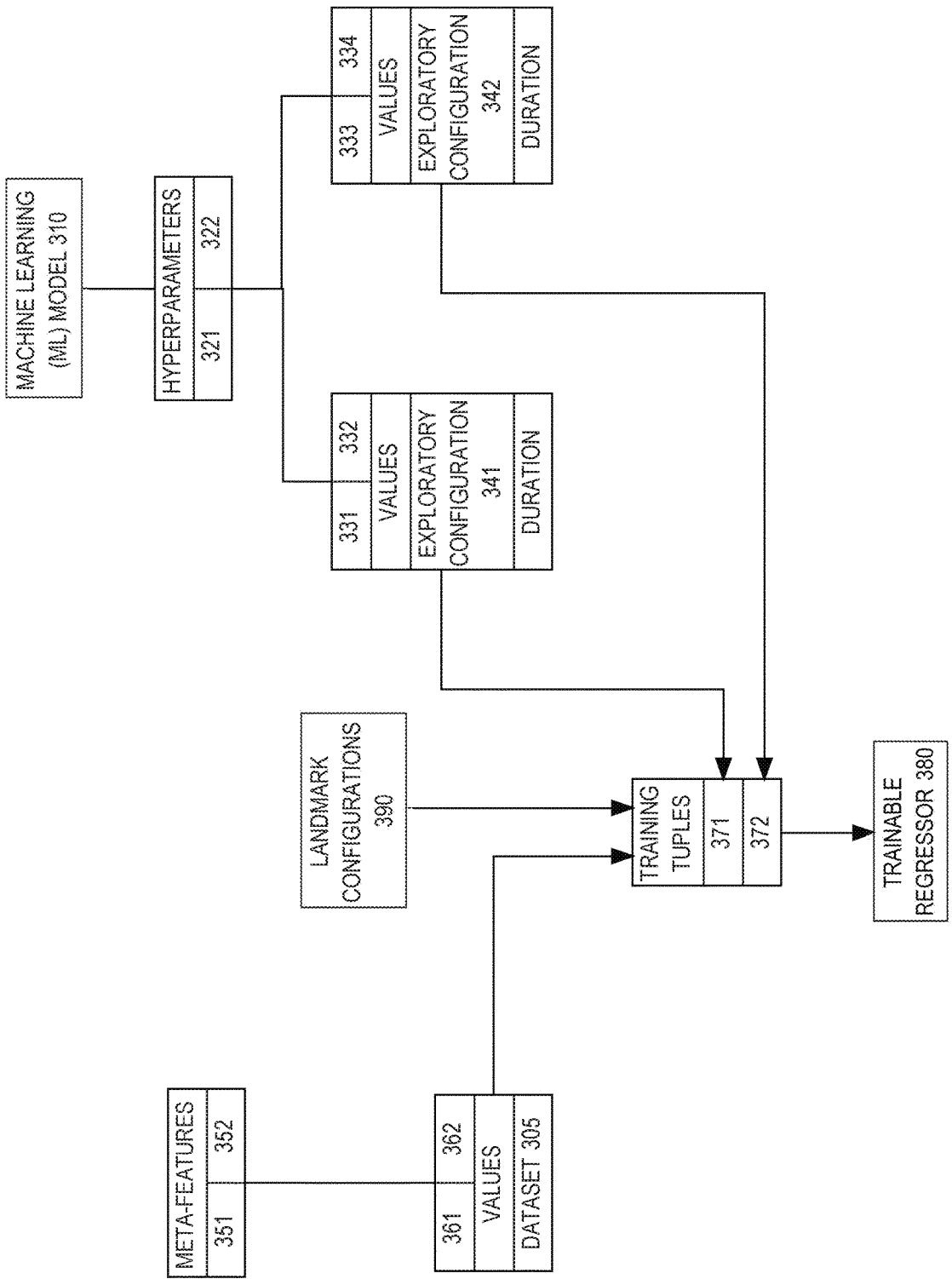
FIG. 3 is a block diagram that depicts an example computer that trains a regressor to predict training times of hyperparameter configurations of an ML model.

FIG. 3 is a block diagram that depicts an example computer 300, in an embodiment. Computer 300 trains a regressor to predict training times of hyperparameter configurations of an ML model. Computer 300 may be an implementation of computer 100.

How a trainable regressor operates depends upon which mode (i.e. lifecycle phase) is the regressor deployed for. A regressor may be deployed in training mode, such as in a laboratory, or in inferencing mode such as in a live production environment. For example, FIG. 1 shows inferencing mode in production. Whereas, FIG. 3 shows training.

Thus, trainable regressor 380 is in training mode. For example, trainable regressor 380 may finish training and then be deployed (e.g. in a different data center) in inferencing mode as trained regressor 180, such that 180 and 380 may be different lifecycle phases of a same regressor. Likewise, ML models 140 and 310 may be models of a same kind with same hyperparameters, although perhaps with different learned values (e.g. connection weights).

Regardless of lifecycle phase, regressors 180 and 380 may share a same input feature vector format. In other words, the feature vector format does not change when a regressor is transitioned (e.g. redeployed) from training to production. As with FIG. 1, the feature vector is a concatenation of dataset meta-feature values, ML model hyperparameter values of a proposed configuration and some landmark configurations, and training times.

Training is repetitious, with a distinct proposed configuration per repetition. During each repetition, a new exploratory configuration such as 341-342 is generated and designated as a proposed configuration. ML model 310 is configured with hyperparameter values of the proposed configuration and then trained with dataset 305, for which a training duration is recorded. Thus, each of exploratory configurations 341-342 has a recorded duration and a distinct set of values for hyperparameters 321-322.

Each of exploratory configurations 341-342 may be represented as separate training tuples 371-372 that are feature vectors for trainable regressor 380. For example, exploratory configuration 341 is represented by training tuple 371. Training tuple 371 includes hyperparameter values 331-332 and the recorded training duration for exploratory configuration 341.

Each training tuple contains a concatenation of dataset meta-feature values 361-362 and the hyperparameter values and training durations of all of landmark configurations 390. What varies between training tuples 371-372 are the times and values from exploratory configurations 341-342. Whereas, dataset meta-feature values 361-362 and landmarks times and values may be constant across some or all training tuples of a same dataset. For example, a same dataset 305 may be used for all trainings of ML model 310. Indeed, a same dataset may be used for both training and production inferencing. For example, datasets 110 and 305 may be identical.

Which dataset (e.g. 305) is used may change during training, between training and production, and/or during production use. Regardless of whether in training or production, computer 300 may or may not generate new landmark configurations, such as 390, when datasets are switched. In an embodiment, dataset 305 may be folded (e.g. for cross validation) or otherwise divided into training subsets, and each subset may or may not have its own landmark configurations. For example, even when landmark configurations (i.e. hyperparameter values) are constant, different datasets may yield different training durations for a same landmark configuration. Thus multiple training folds, each with its own meta-feature values and landmark times, may yield a rich corpus (i.e. training tuples 371-372) from which trainable regressor 380 may achieve high accuracy without overfitting.

During training, trainable regressor 380 processes one of training tuples 371-372 at a time. In an embodiment, training tuples 371-372 are generated at different times, and trainable regressor 380 may process one training tuple without waiting for all training tuples to be available. Thus, asynchrony is possible in various places in the dataflow shown in FIG. 3. Thus batching, pipeline parallelism, and horizontal scaling may accelerate training of model 310, 380, or both. For example, ML model 310 may be cloned and concurrently trained for both of exploratory configurations 341-342.

4.0 Example Regressor Trianing Process

Figure 4:
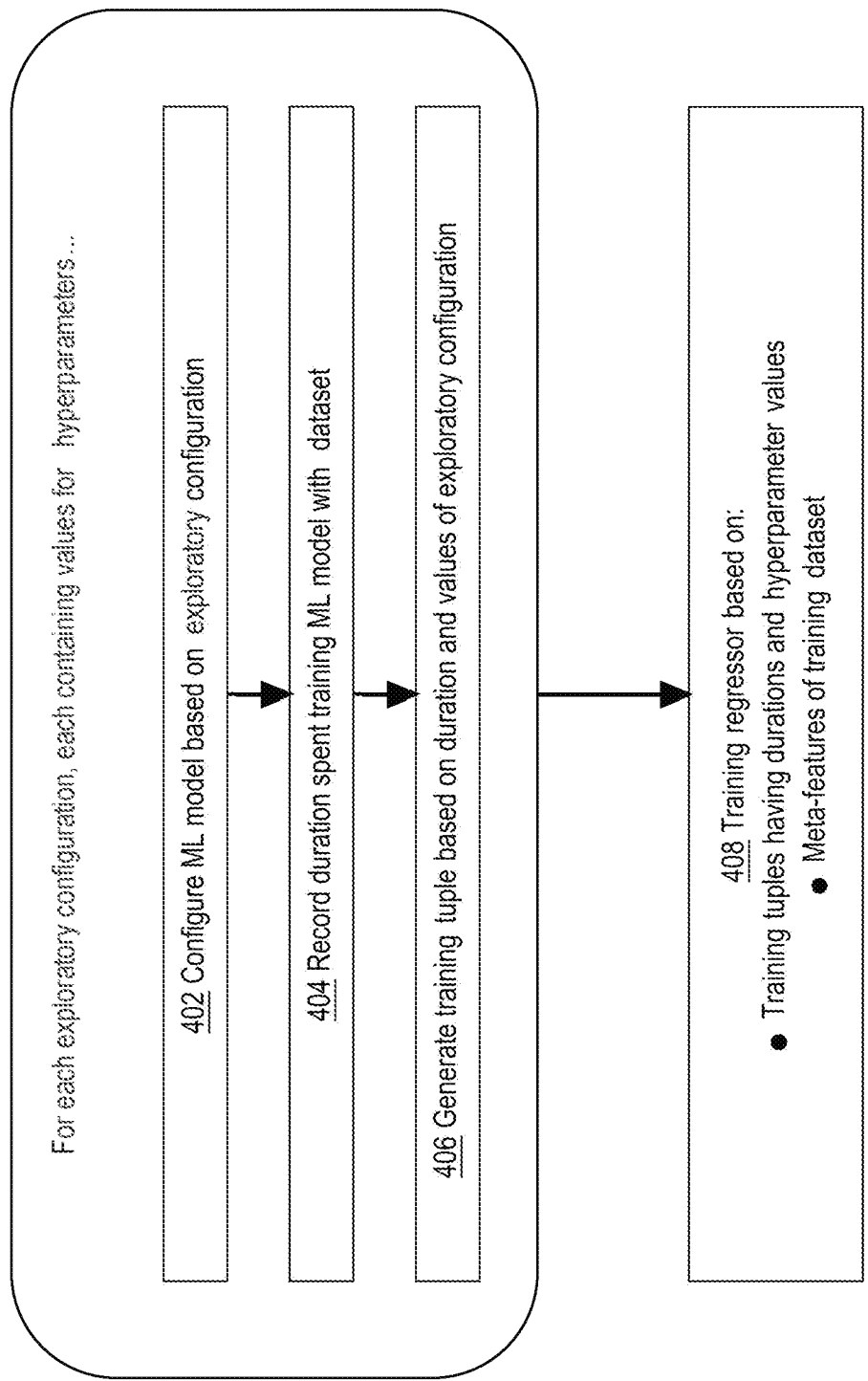
FIG. 4 is a flow diagram that depicts an example computer process for training a regressor to predict training times of hyperparameter configurations of an ML model.

FIG. 4 is a flow diagram that depicts computer 300 training a regressor to predict training times of hyperparameter configurations of an ML model, in an embodiment. FIG. 4 is discussed with reference to FIG. 3.

FIG. 4 shows a complicated process because of meta-learning in which trainable regressor 380 learns the performance landscape of ML model 310. FIG. 4 has a separate training phase for each of models 310 and 380. In the first phase, the performance landscape of ML model 310 is discovered by repeatedly training ML model 310. Training ML model 310 entails repeating steps 402, 404, and 406 for each of many exploratory hyperparameter configurations.

Heuristics for generating exploratory configurations, such as 341-342, depend on the embodiment. Various embodiments may generate exploratory configurations 341-342 randomly, greedily (i.e. gradient following), or some combination of both. In an embodiment, exploratory configurations 341-342 are instead generated according to uniform intervals along a regular grid in hyperspace.

Step 402 configures ML model 310 with hyperparameter values of a next exploratory configuration, such as 341. Step 404 records how long training ML model 310 takes for that configuration and dataset 305. Termination (e.g. convergence) criteria for each training (i.e. occurrence of step 404) depends on the embodiment and may be based on a threshold for absolute accuracy and/or accuracy gradient. Regressor accuracy may be calculated such as with mean-squared error (MSE), coefficient of determination (R2), Pearson correlation coefficient, and/or Spearman rank correlation. Prudentially, an embodiment may also abort a training based on a threshold for elapsed time and/or elapsed internal iterations (i.e. stragglers), although this may attenuate the quality of the discovered hyperspace landscape.

Step 406 generates a training tuple, such as 371, that encodes hyperparameter values of the current configuration and the recorded training time. Each training tuple further includes data that is repeated across all tuples 371-372. That repeated data includes dataset meta-feature values 361-362 and details of landmark configurations 390, including hyperparameter values and benchmark durations.

After step 406 is finished for all exploratory configurations, a corpus of training tuples 371-372 exists for training trainable regressor 380. Complete construction of that training corpus finishes the first phase of FIG. 4. In an embodiment, each of training tuples 371-372 is encoded as a feature vector that is suitable for later injection into trainable regressor 380.

The second phase of FIG. 4 entails step 408 that trains trainable regressor 380 based on the corpus of training tuples 371-372, including landmark configurations 390 and meta-features of dataset 305. Training regressor 380 entails individually injecting training tuples 371-372 into regressor 380, measuring how erroneous is regressor 380's reaction, and accordingly adjusting the internal values of regressor 380 to reduce the possibility and/or magnitude of error that may occur in the future. For example if regressor 380 is an artificial neural network (ANN), then internal adjustment may entail back propagation and/or gradient optimization. If dataset 305 is replaced, then landmark configurations 390 may need regeneration, such as with folded cross validation. For example if training tuples 371-372 are based on different datasets, then training tuples 371-372 may contain different dataset meta-feature values and different landmark configuration values for hyperparameters and benchmark durations. Such diversity of training data may prevent overfitting.

After step 408, regressor 380 is fully trained and may be saved for deployment into a production environment for live inferencing. For example, values of hyperparameters (e.g. neural layer count) and learned parameters (e.g. neural connection weights) may be saved into a file that is eventually transferred to the production environment for reconstructing regressor 380.

5.0 Example Regressor Tuning Process

Figure 5:
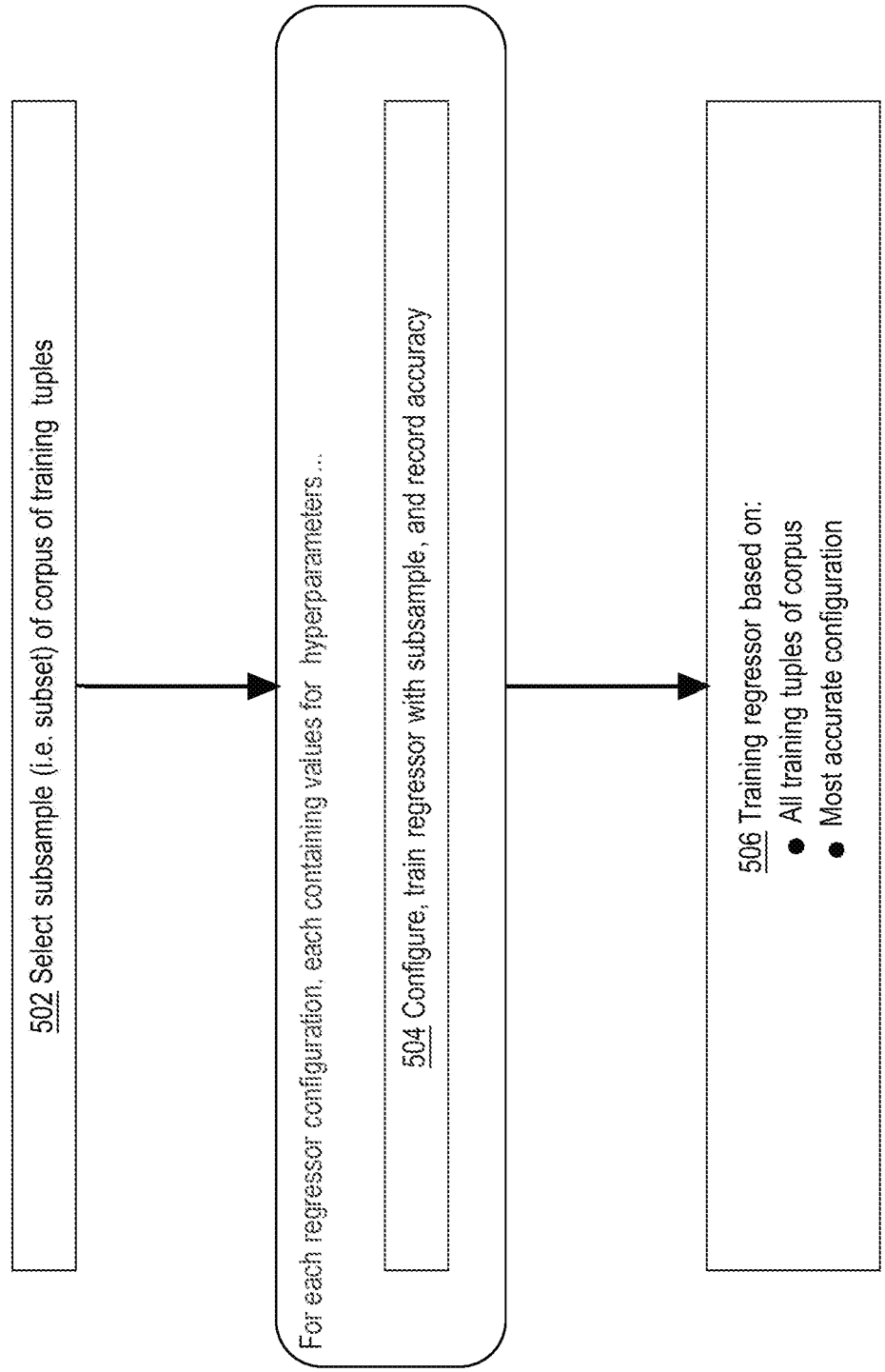
FIG. 5 is a block diagram that depicts an example computer quickly discovering a most accurate hyperparameter configuration of a prediction regressor.

FIG. 5 is a flow diagram that depicts computer 300 quickly discovering a most accurate hyperparameter configuration of a prediction regressor, in an embodiment. FIG. 5 is discussed with reference to FIG. 3.

As discussed above, FIG. 4 trains a pre-configured regressor. Whereas, FIG. 5 further discovers a most accurate configuration as a preface to full training of a regressor. In an embodiment, FIGS. 4-5 may be integrated such that steps 408 and 506 are a same step, and steps 502 and 504 occur between steps 406 and 408.

FIG. 5 occurs in two phases as follows. In a first phase, steps 502 and 504 discover a best (e.g. most accurate) hyperparameter configuration for prediction regressor 380. In a second phase, step 506 fully trains regressor 380 based on the best configuration.

FIGS. 3-5 have two configuration hyperspaces, which are one for each of models 310 and 380. FIG. 5 introduces exploration of the configuration hyperspace of regressor 380 and uses training corpus subsampling to accelerate that exploration. Subsampling entails training with (e.g. much) less than an entire training corpus and may seem somewhat like training dataset folding. A difference between subsampling and folding is that all trainings share a same subset instead of rotating through different folds.

Although the techniques of FIG. 5 are presented for hyperparameter tuning of regressor 380, similar techniques may instead or additionally be used for hyperparameter tuning of ML model 310. For example, subsampling may be used to accelerate landmark benchmarking of ML model 310. For example, each of landmark configurations 390 may be training benchmarked with a (e.g. same) subsample of dataset 305. Indeed, because landmark benchmarking may occur in production during prediction, subsampling may be essential to containing production latency. If subsampling is used for benchmarking a landmark for ML model 310, then that benchmark duration should not be used as a final prediction for that landmark. Instead, the landmark may be submitted as a current configuration for ordinary prediction by regressor 380 using all of dataset 305 to generate a more accurate prediction for that landmark configuration as if it were not a landmark.

Step 502 is preparatory and isolates a subsample by selecting a subset of training tuples 371-372 of the performance corpus. That subsample is used in step 504 that is repeated for each of several possible hyperparameter configurations (not shown) of regressor 380. Heuristics for generating possible regressor configurations depend on the embodiment. Various embodiments may generate regressor configurations 341-342 randomly, greedily (i.e. gradient following), or some combination of both. In an embodiment, regressor configurations are instead generated according to uniform intervals along a regular grid in hyperspace.

Step 504 configures regressor 380 with a next configuration, trains the regressor with the performance subsample, and records the accuracy achieved and/or time spent for training and/or one test inferencing. How many regressor configurations is step 504 repeated for depends on the embodiment. Termination/convergence criteria are generally discussed above herein. If random and/or greedy exploration is used, then termination may be based on a count of configurations and/or a total elapsed time for many configurations. For example, an embodiment may cease repeating step 504 after exploring a thousand regressor configurations or after exploring as many configurations as possible in one hour.

While computer 300 explores the regressor configuration hyperspace by repeating step 504, computer 300 may keep track of a best configuration found so far. A best configuration may be a most accurate, a fastest inferencing, a fastest training, or a weighted combination of some or all of those metrics. Thus when step 506 begins, the best configuration for regressor 380 is known.

Step 506 configures regressor 380 with the best hyperparameter values and then fully trains regressor 380 with entire corpus of training tuples 371-372. For example, step 506 may train as described above for step 408.

6.0 Derived Features

Figure 6:
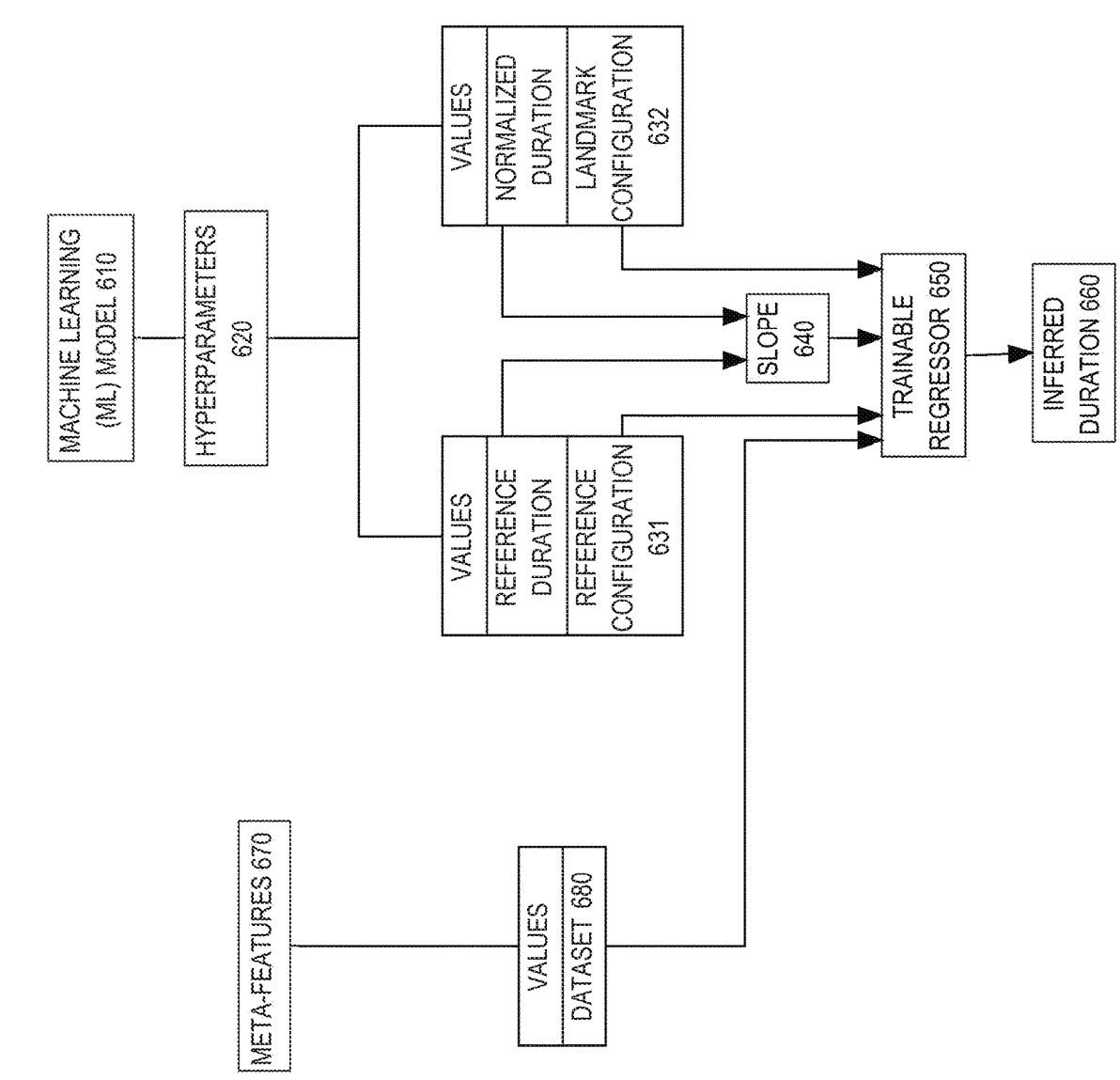
FIG. 6 is a block diagram that depicts an example computer, from raw feature data, deriving other feature data that is more useful (e.g. reliable) to a regressor.

FIG. 6 is a block diagram that depicts an example computer 600, in an embodiment. From raw feature data, computer 600 derives other feature data that is more useful (e.g. reliable) to a regressor. Computer 600 may be an implementation of computer 100.

Machine learning is flexible. For example, ML model 610 may conform to a variety of hyperparameter configurations, such as 631-632, and process a variety of comparable datasets, such as 680. Unfortunately, that flexibility may confuse performance comparisons.

For example, a single adjustment to hyperparameters 620 may accelerate training for several datasets. However, an absolute training time savings of ten minutes may be more or less significant depending on which dataset is involved. For example, reducing a half hour training by ten minutes may be very significant. Whereas, reducing a twenty-four hour training by ten minutes may be insignificant.

That discrepancy of significance for similar absolute measurements may distort the accuracy of trainable regressor 650. Thus, computer 600 normalizes empirical measurements to achieve a uniformity of metrics that improves reliability of performance comparisons across a wider range of datasets and model configurations. Normalization entails scaling empirical durations relative to a training duration of reference configuration 631. Reference configuration 631 may have reasonable default values for hyperparameters 620.

The reference training duration for reference configuration 631 should be measured first. That is, ML model 610 should be configured with the hyperparameter values of reference configuration 631, trained, and timed, before other configurations are tried. For example, trainable regressor 650 as shown is already trained and deployed in inferencing mode. A use case may be to predict a training time for a new configuration of ML model 610 and/or a new dataset 680.

Computer 600 may first evaluate reference configuration 631 as a landmark configuration and then evaluate other landmark configurations such as 632. All of the landmark training times may be normalized to the duration of reference configuration 631. Thus, the reference duration of reference configuration 631 normalizes to 1.0. The normalized duration of landmark configuration 632 may be more or less than 1.0 to indicate relatively more or less training time spent. Training durations that are encoded into a feature vector for trainable regressor 650 are normalized, which increases the accuracy of trainable regressor 650. For example, trainable regressor 650 may predict inferred duration 660 that is normalized and can later be denormalized to revert back to an empirical duration when needed downstream. For example, a normalized duration may be a ratio of empirical time to reference time, and denormalization may restore the empirical time by multiplying the normalized ratio times the reference time. Thus, raw times may always be recovered, so long as the empirical reference duration remains recorded. In an embodiment, normalized duration is a percent deviation of empirical time from reference time.

More complicated derivations are possible than normalization. For example, slope 640 may be a slope of a segment of a training time curve such that the segment extends from the reference duration to an empirical duration of a proposed configuration. Unlike a duration, a slope is naturally already normalized. For example, a slope between two normalized times is identical to a slope between their denormalized (i.e. empirical) times. Slope(s) may be an important part of a feature vector because they directly reveal gradient(s) of a solution landscape. For example, a feature vector may include multiple slopes instead of or in addition to multiple (e.g. landmark) durations.

7.0 Landmark Configuration Generation

FIG. 7 is a block diagram that depicts an example computer 700, in an embodiment. Computer 700 has heuristics for generating a more or less optimal set of landmark configurations. Computer 700 may be an implementation of computer 100.

Landmark configurations, such as 1-9 as shown, have opposing design forces. More landmarks confers more accuracy to a prediction regressor. Whereas fewer landmarks reduce latency of a first prediction for a dataset, which may be amortized by (e.g. durably) recording landmark times (e.g. for a same dataset) and then reusing them with a same regressor (not shown) for predictions for various configurations of a same ML model.

In this example, the ML model (not shown) is an multi layer perceptron (MLP) that has at least hyperparameters 711-712. Some hyperparameters, such as 711, may be numeric. For example, hyperparameter 711 may be a count of neural layers, which is adjustable. Hyperparameter 711 may have a natural range. For example, an MLP may have as few as one or two layers or as many layers as an implementation allows or as many as known to be useful up to some point of diminishing returns, such as ten layers. Thus, hyperparameter 711 may have an integer range of 1-10, with one being a minimum, ten being a maximum, and five being a midpoint/mean of those two extremes. Those values of 1, 5, and 10 are shown.

Computer 700 may have heuristics that propose minimum, maximum, and/or midpoint as landmark values for numeric hyperparameters. For example, those three value samplings for each of ten hyperparameters yields a hyperspace sampling of $3^{10}$=~60 thousand landmark configurations. In an embodiment, an engineer may designate a subset of the ten hyperparameters as significant to landmarking. For example, if only half (i.e. five) of the hyperparameters are very significant, then initial sampling may be reduced to $3^{5}$=243 landmark configurations. For example, sixty thousand landmarks when concatenated may yield a feature vector that is too wide, which may be infeasible or have diminished returns.

A categorical hyperparameter, such as 712, may be naturally unordered such that there are no minimum, maximum, and middle values. For example, hyperparameter 712 may have three mutually exclusive choices for an activation function for the MLP, which are sigmoid, hyperbolic tangent (tanh), and rectified linear units (ReLU). For example, sigmoid behaves intuitively (i.e. stable, unsurprising). Hyperbolic tangent is more amenable to training, which may accelerate convergence and training. ReLU is computationally more efficient, which may accelerate training.

Computer 700 may have a heuristic that proposes all possible values of a categorical hyperparameter as landmark values. For example as shown, the three possible values for an activation function all occur within the landmark configurations. All landmark values, whether numeric or categorical may be repeated to (e.g. exhaustively) elaborate various hyperparameter combinations as landmark configurations as shown.

In an embodiment, numeric hyperparameters are correlated with ML model training time, such as by calculating a correlation coefficient as discussed above. A step function, such as a sign function, may be applied to a respective correlation coefficient of each numeric hyperparameter to detect whether the correlation coefficient is positive or negative. Two landmarks may be obtained based on positive and negative correlation coefficients. A first landmark may be obtained by: a) selecting a minimum value from a range of each numeric hyperparameter that has a positive correlation coefficient, and b) selecting a maximum value from a range of each numeric hyperparameter that has a negative correlation coefficient. Non-numeric hyperparameters may be set to their respective default values. A second landmark may be obtained in an opposite strategy to the first. That is, it is obtained by selecting a maximum value from a range of each numeric hyperparameter that has a positive correlation coefficient, and selecting a minimum value from a range of each numeric hyperparameter that has a negative correlation coefficient.

The following is an implementation example. Training times are recorded for 339 binary classification datasets available from OpenML open source library. Fifty-fold cross-validation separates datasets into training and test subsets.

For one of the folds, 332 of the 339 datasets are used for training and the remaining six are used for testing. This process is repeated fifty times with a test corpus comprising 6-7 unique datasets each time, until all datasets have been tested. Within each fold, a training portion of the datasets is further split into 80/20 training and validation splits for regressor hyperparameter tuning.

Once the best hyperparameters are selected, the regressor predicts training time of the test datasets for the same set of hyperparameter configurations that training was performed on. Mean-squared error (MSE) is used as a training objective function and R2 scoring is used for hyperparameter tuning. Sklearn's RandomForestRegressor is used for training time prediction.

For prediction evaluation purposes, an R2 score is calculated for each dataset, along with MSE and Pearson R score across all predicted hyperparameter configurations. Scores are then aggregated across all 339 tested datasets, obtained from 50 folds, to generate the following metrics: average dataset R2 score (Average DS R2), number of datasets with negative R2 score (# Negative DS R2), and average dataset Pearson R score (Average DS Pearson R). Additionally derived are R2 score and MSE across all 339 datasets and hyperparameter predictions without first grouping by datasets.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
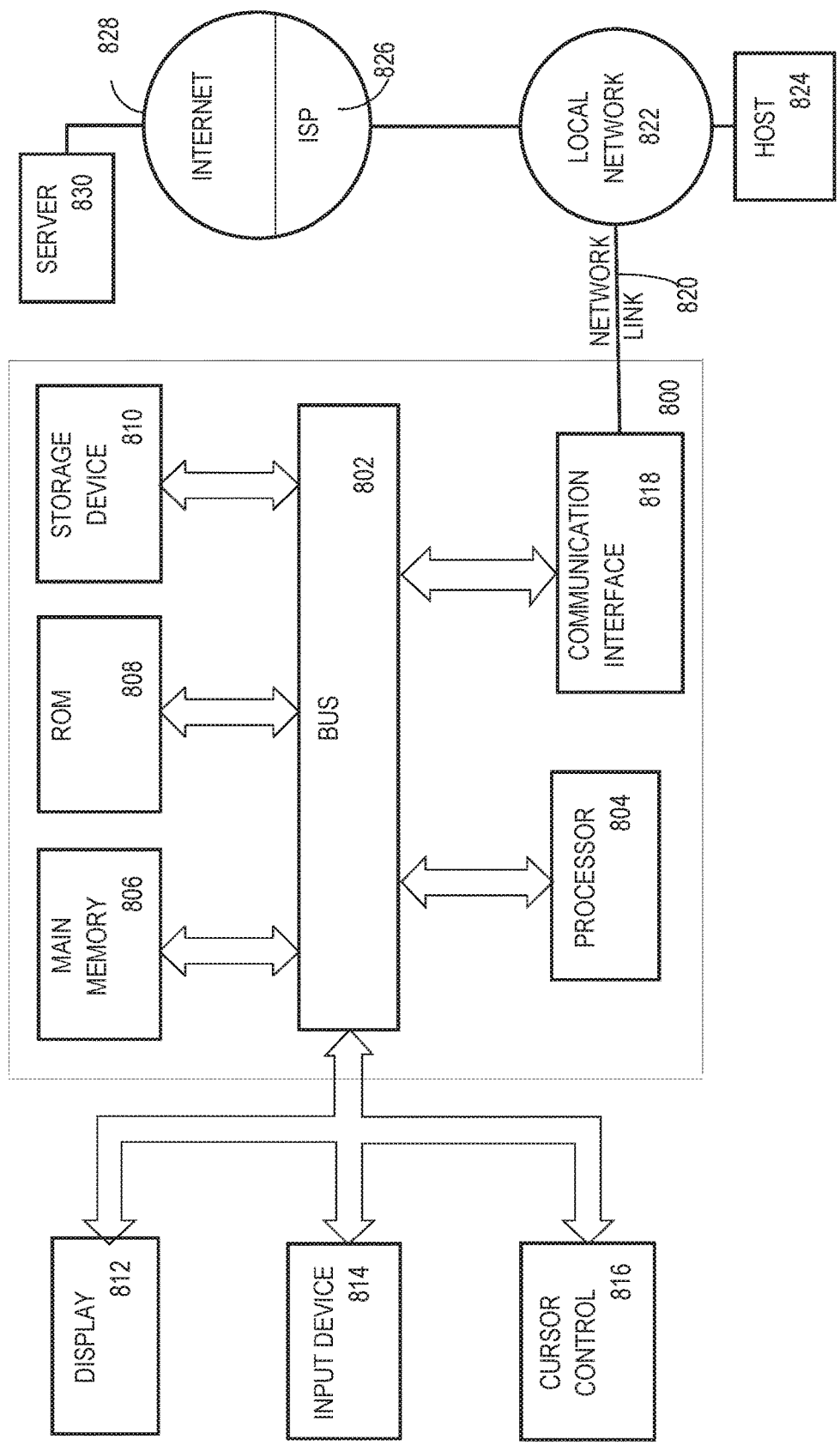
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
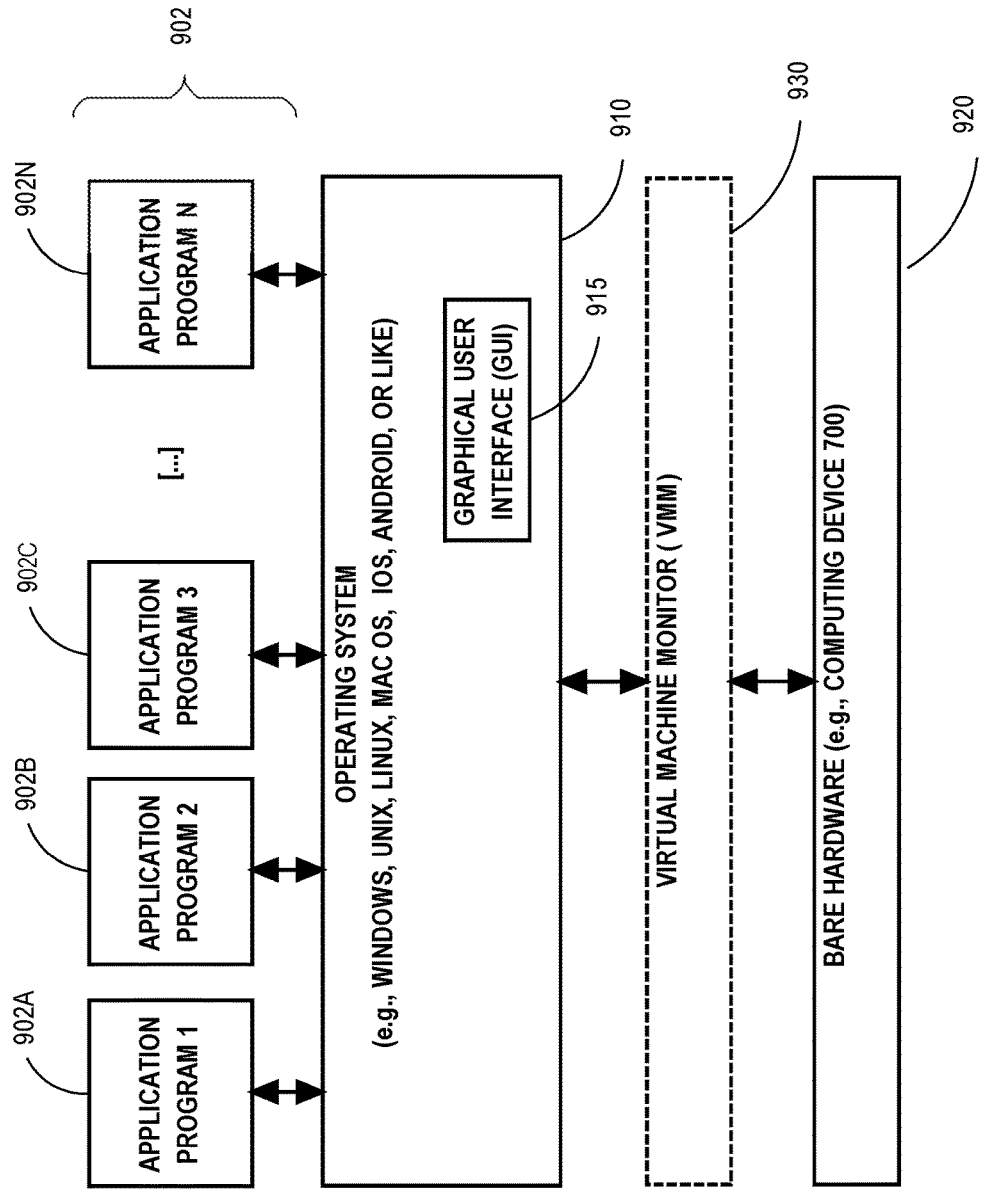
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
for each landmark configuration of a plurality of landmark configurations that each contain a plurality of values for a plurality of hyperparameters of a machine learning (ML) model:
configuring the ML model based on the landmark configuration, wherein each value of the plurality of values of the landmark configuration corresponds to a distinct hyperparameter of the plurality of hyperparameters of the ML model, and storing, in the landmark configuration, a duration spent training once, based on a respective dataset, the ML model that is configured based on the landmark configuration;

generating a feature vector that encodes a proposed configuration of the ML model, wherein the feature vector contains:

a respective proposed value for each hyperparameter of the plurality of hyperparameters of the ML model, a plurality of values, based on a new dataset, of a plurality of meta-features, and the plurality of landmark configurations that contain the durations;

predicting, by a regressor that is applied to the feature vector that contains the proposed values of the plurality of hyperparameters of the ML model and plurality of landmark configurations that contain the durations, an inferred duration needed to train the ML model once.

2. The method of claim 1 wherein:

said dataset is a first dataset;

a plurality of exploratory configurations is larger than the plurality of landmark configurations;

the method further comprises:

for each exploratory configuration of the plurality of exploratory configurations that each contain a plurality of values for said plurality of hyperparameters:

configuring the ML model based on the exploratory configuration;

measuring a second duration spent training, based on a second dataset, the ML model; and generating, within a plurality of training tuples, a training tuple based on:

the second duration, the plurality of values of the exploratory configuration, and a plurality of values, based on the second dataset, of said plurality of meta-features;

training the regressor based on the plurality of training tuples.

3. The method of claim 2 wherein one selected from the group consisting of:

a) the second dataset is the first dataset, b) the second dataset is larger than the first dataset, and c) said proposed configuration is contained in at least one selected from the group consisting of: said plurality of exploratory configurations, and said plurality of landmark configurations.

4. The method of claim 2 wherein said training the regressor comprises measuring accuracy of the regressor based on at least one selected from the group consisting of: coefficient of determination (R2), and Spearman rank correlation.

5. The method of claim 2 wherein said training the regressor comprises:

for each hyperparameter configuration of a plurality of hyperparameter configurations of the regressor:

training the regressor with a subset of the second dataset and the hyperparameter configuration; and measuring accuracy of the trainable regressor based on said hyperparameter configuration;

training the regressor with the second dataset and a most accurate hyperparameter configuration of said measuring accuracy.

6. The method of claim 1 wherein:

the plurality of landmark configurations comprises a reference configuration;

said duration spent training is a reference duration when said each landmark configuration is said reference configuration;

a normalized duration, of a plurality of normalized durations, is based on said duration relative to the reference duration;

said predicting by the regressor is based on the plurality of normalized durations.

7. The method of claim 6 wherein said duration relative to the reference duration comprises a percent deviation of said duration from the reference duration.

8. The method of claim 6 wherein:

the regressor is an artificial neural network (ANN);

said predicting by the regressor is based on a slope of normalized durations of two landmark configurations of the plurality of landmark configurations.

9. The method of claim 1 wherein the plurality of landmark configurations comprises, for each numeric hyperparameter of said plurality of hyperparameters, at least one selected from the group consisting of:

a landmark configuration having said plurality of values that contains a minimum value for said numeric hyperparameter, a landmark configuration having said plurality of values that contains a maximum value for said numeric hyperparameter, and a landmark configuration having said plurality of values that contains a value for said numeric hyperparameter that is halfway between two of: said minimum value, said maximum value, and a default value.

10. The method of claim 1 wherein the plurality of landmark configurations comprises, for each hyperparameter of said plurality of hyperparameters that is categorical, landmark configurations that each have said plurality of values that contains a distinct value for said hyperparameter.

11. The method of claim 1 wherein said plurality of meta-features comprises at least one selected from the group consisting of:

a) a majority count of examples within said dataset having a majority label of a plurality of labels of said dataset, b) a minority count of examples within said dataset having a minority label of a plurality of labels of said dataset, and c) a ratio of two selected from the group consisting of: a total count of examples within said dataset, said majority count, and said minority count.

12. The method of claim 1 wherein:

the regressor is a random forest;

the method further comprises using the random forest to rank features of said dataset by importance.

13. One or more non-transitory computer-readable media storing instructions that, when executed by one or more processors, cause:

for each landmark configuration of a plurality of landmark configurations that each contain a plurality of values for a plurality of hyperparameters of a machine learning (ML) model:

configuring the ML model based on the landmark configuration, wherein each value of the plurality of values of the landmark configuration corresponds to a distinct hyperparameter of the plurality of hyperparameters of the ML model, and storing, in the landmark configuration, a duration spent training once, based on a respective dataset, the ML model that is configured based on the landmark configuration;

generating a feature vector that encodes a proposed configuration of the ML model ,
wherein the feature vector contains:
a respective proposed value for each hyperparameter of the plurality of hyperparameters of the ML model,
a plurality of values, based on a new dataset, of a plurality of meta-features, and
the plurality of landmark configurations that contain the durations;
predicting, by a regressor that is applied to the feature vector that contains the proposed values of the plurality of hyperparameters of the ML model and plurality of landmark configurations that contain the durations, an inferred duration needed to train the ML model once.

14. The one or more non-transitory computer-readable media of claim 13 wherein:
said dataset is a first dataset;
a plurality of exploratory configurations is larger than the plurality of landmark configurations;
the instructions further cause:
for each exploratory configuration of the plurality of exploratory configurations that each contain a plurality of values for said plurality of hyperparameters:
configuring the ML model based on the exploratory configuration;
measuring a second duration spent training, based on a second dataset, the ML model; and
generating, within a plurality of training tuples, a training tuple based on:
the second duration,
the plurality of values of the exploratory configuration, and
a plurality of values, based on the second dataset, of said plurality of meta-features;
training the regressor based on the plurality of training tuples.

15. The one or more non-transitory computer-readable media of 14 wherein one selected from the group consisting of:
a) the second dataset is the first dataset,
b) the second dataset is larger than the first dataset, and
c) said proposed configuration is contained in at least one selected from the group consisting of: said plurality of exploratory configurations, and said plurality of landmark configurations.

16. The one or more non-transitory computer-readable media of claim 14 wherein said training the regressor comprises measuring accuracy of the regressor based on at least one selected from the group consisting of: coefficient of determination (R2), and Spearman rank correlation.

17. The one or more non-transitory computer-readable media of claim 14 wherein said training the regressor comprises:
for each hyperparameter configuration of a plurality of hyperparameter configurations of the regressor:
training the regressor with a subset of the second dataset and the hyperparameter configuration; and
measuring accuracy of the regressor based on said hyperparameter configuration;
training the regressor with the second dataset and a most accurate hyperparameter configuration of said measuring accuracy.

18. The one or more non-transitory computer-readable media of claim 13 wherein:
the plurality of landmark configurations comprises a reference configuration;
said duration spent training is a reference duration when said each landmark configuration is said reference configuration;
a normalized duration, of a plurality of normalized durations, is based on said duration relative to the reference duration;
said predicting by the regressor is based on the plurality of normalized durations.

19. The one or more non-transitory computer-readable media of claim 18 wherein said duration relative to the reference duration comprises a percent deviation of said duration from the reference duration.

20. The one or more non-transitory computer-readable media of claim 18 wherein:
the regressor is an artificial neural network (ANN);
said predicting by the regressor is based on a slope of normalized durations of two landmark configurations of the plurality of landmark configurations.

* * * * *

UNITED STATES PATENT AND TRADEMARK OFFICE
CERTIFICATE OF CORRECTION

PATENT NO. : 11,429,895 B2
APPLICATION NO. : 16/384588
DATED : August 30, 2022
INVENTOR(S) : Yakovlev et al.

It is certified that error appears in the above-identified patent and that said Letters Patent is hereby corrected as shown below:

On the Title Page

On page 2, Column 2, under item (56) Other Publications, Line 3, delete "Applicationsm AIMSA" and insert -- Applications MSA --, therefor.

On page 2, Column 2, under item (56) Other Publications, Line 36, delete "Machinelearning," and insert -- Machine learning, --, therefor.

On page 3, Column 1, under item (56) Other Publications, Lines 11-12, delete "Seletion" and insert -- Selection --, therefor.

On page 3, Column 2, under item (56) Other Publications, Line 32, delete "Artifical" and insert -- Artificial --, therefor.

On page 3, Column 2, under item (56) Other Publications, Line 40, delete "Algotithm" and insert -- Algorithm --, therefor.

On page 4, Column 2, under item (56) Other Publications, Line 24, delete "6_l," and insert -- 6_1, --, therefor.

In the Specification

In Column 8, Line 37, delete "Trianing" and insert -- Training --, therefor.

In Column 13, Line 41, delete "RandomForestRegressor" and insert -- Random Forest Regressor --, therefor.

In Column 17, Line 65, delete "DbaaS" and insert -- DBaaS --, therefor.

Signed and Sealed this
Twenty-first Day of February, 2023

*Katherine Kelly Vidal*

Katherine Kelly Vidal
*Director of the United States Patent and Trademark Office*

CERTIFICATE OF CORRECTION (continued)
U.S. Pat. No. 11,429,895 B2

In the Claims

In Column 23, Line 60, in Claim 5, after "the" delete "trainable", therefor.

In Column 25, Line 2, in Claim 13, delete "model ," and insert -- model, --, therefor.

In Column 25, Line 40, in Claim 15, after "of" insert -- claim --, therefor.